United States Patent
Scholte-Wassink et al.

(10) Patent No.: US 11,473,560 B2
(45) Date of Patent: Oct. 18, 2022

(54) METHOD FOR DETECTING IRREGULAR TURBINE OPERATION USING DIRECT AND INDIRECT WIND SPEED MEASUREMENTS

(71) Applicant: General Electric Company, Schenectady, NY (US)

(72) Inventors: Hartmut Scholte-Wassink, Salzbergen (DE); Arne Koerber, Salzbergen (DE)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 16/992,555

(22) Filed: Aug. 13, 2020

(65) Prior Publication Data

US 2021/0047996 A1 Feb. 18, 2021

(30) Foreign Application Priority Data

Aug. 14, 2019 (EP) ...................................... 19191744

(51) Int. Cl.
*F03D 7/02* (2006.01)
*F03D 7/04* (2006.01)

(52) U.S. Cl.
CPC ............ *F03D 7/0264* (2013.01); *F03D 7/045* (2013.01); *F05B 2270/3201* (2013.01); *F05B 2270/404* (2013.01)

(58) Field of Classification Search
CPC ................... F03D 7/0264; F03D 7/045; F05B 2270/3021; F05B 2270/404
See application file for complete search history.

(56) References Cited

U.S. PATENT DOCUMENTS 8,102,067 B2    1/2012  Soeren et al.
9,605,558 B2 *  3/2017  Perley .................... F01D 17/04
(Continued)

FOREIGN PATENT DOCUMENTS

EP    2080901 A2    7/2009
EP    2108829 A1   10/2009
(Continued)

OTHER PUBLICATIONS

European Search Report Corresponding to EP19191744 dated Mar. 13, 2020.

*Primary Examiner* — Michael L Sehn
(74) *Attorney, Agent, or Firm* — Dority & Manning, P.A.

(57) ABSTRACT

Method for operating a wind turbine, the wind turbine including a wind characteristics sensor for measuring a wind characteristic and at least one wind turbine state sensor for measuring a state of the wind turbine, the method comprising: determining or adjusting (102) one or more wind characteristics relationships; and, performing (104) an operation phase, the operation phase including: measuring the wind characteristics with the wind characteristics sensor, thereby obtaining measured wind characteristics; measuring the state of the wind turbine with the at least one wind turbine state sensor and determining an estimated wind characteristics from the measured state of the wind turbine and parameters of the wind turbine; comparing the estimated wind characteristics to an expected wind characteristics determined from the measured wind characteristics, wherein the expected wind characteristics is determined based on the one or more wind characteristics relationships; and, operating or shutting down the wind turbine based at least in part on the comparison result.

15 Claims, 5 Drawing Sheets

(56) References Cited

U.S. PATENT DOCUMENTS

| | | |
|---|---|---|
| 2009/0183576 A1 | 7/2009 | Honhoff et al. |
| 2010/0001526 A1 | 1/2010 | Fukuda et al. |
| 2013/0259682 A1 | 10/2013 | Kammer |
| 2015/0056072 A1 | 2/2015 | Perley et al. |
| 2019/0353144 A1 | 11/2019 | Nielsen |

FOREIGN PATENT DOCUMENTS

| | | |
|---|---|---|
| EP | 2644887 A2 | 10/2013 |
| EP | 2840258 A1 | 2/2015 |
| WO | WO2018-001434 A1 | 1/2018 |

* cited by examiner

METHOD FOR DETECTING IRREGULAR TURBINE OPERATION USING DIRECT AND INDIRECT WIND SPEED MEASUREMENTS

FIELD

The subject matter described herein relates to methods for operating a wind turbine and to wind turbines, and more particularly to methods for operating a wind turbine including a wind characteristics sensor for measuring wind characteristics and at least one wind turbine state sensor for measuring a state of the wind turbine from which an estimation of the wind characteristics is obtained.

BACKGROUND

Wind turbines typically include a tower and a nacelle mounted on the tower. A rotor is rotatably mounted to the nacelle and is coupled to an electric generator by a shaft. A plurality of blades extend from the rotor. The blades are oriented such that wind passing over the blades turns the rotor and rotates the shaft, thereby driving the generator to generate electricity.

A wind turbine converts wind energy into mechanical energy, e.g. into rotational kinetic energy, and the mechanical energy is typically further converted to electrical energy by a wind turbine generator. A blade pitch angle, i.e. an angle of attack of a blade of the rotor of the wind turbine with respect to the direction of the wind flow, can be adjusted in order to control force and/or torque acting on the blade. The rotational speed of the rotor of the wind turbine and the electrical power generated by the wind turbine generator, driven by the rotor through the shaft of the wind turbine, can therefore be controlled adjusting the pitch angle of the blades of the wind turbine.

A blade pitch angle may be adjusted for each blade individually or collectively for one or more blades of the wind turbine. As the wind speed changes, the blade pitch angle of one or more blades of the wind turbines is adjusted to keep rotor speed and torque within operating limits for maximizing efficiency of the generation of electrical energy by the wind turbine generator, whilst minimizing the risks of damages to the wind turbine due to e.g. sudden wind gusts.

A wind turbine may reach a stall condition, i.e. a condition such that if the angle of attack of one or more blades is increased the maximum power that the wind turbine generates begins to decrease. For actual wind conditions, an angle of attack of one or more blades for which a further increase of the angle of attack produces a decrease in power is an angle of attack producing a stall condition. The minimum angle of attack producing a stall condition is called critical angle of attack for the actual wind conditions.

A wind turbine may be operated in a stall condition, but when the angle of attack of the one or more blades is further increased, a significant stall condition or deep stall condition may result. It is not desirable to operate a wind turbine in a significant stall condition or deep stall condition.

Typical critical angles of attack are in the range of 15 to 20 degrees. Generally a wind turbine is said to be in a stall condition, i.e., stalling, if the angle of attack exceeds the critical angle. To avoid any stall on parts of the blade, angles of attack are typically required to be around 3 to 5 deg. below the critical angle of attack during the operation of a wind turbine. Therefore, a significant stall condition or deep stall condition may be any condition wherein the wind turbine is stalling when the angle of attack exceeds the critical angle of attack.

In a significant stall condition, turbulence of wind flow may result in a chaotic or irregular dynamic of the wind flowing at the wind turbine. An operation in a significant stall condition may be part of a wind turbine operation, but a significant stall condition is usually undesired due to the prevalence of negative effects like e.g. chaotic or irregular wind flow and/or power decrease. Furthermore, excessive wind speeds or wind gusts may damage the wind turbine and an operation in a significant stall condition in the presence of intense winds may pose a significant risk of damage to blades and/or other wind turbine components.

A malfunctioning or a disturbed condition of the wind turbine may result from different causes like e.g. an icing of the blades of the wind turbine, deposited dirt on the blades of the wind turbines, an aging of wind turbine components or from other external or internal factors affecting the functioning of the wind turbine.

Thus, it would be beneficial to reliably detect and/or prevent a significant stall condition of the wind turbine or a malfunctioning or a disturbed condition of the wind turbine.

SUMMARY

According to one aspect, a method for operating a wind turbine is provided, the wind turbine including a wind characteristics sensor for measuring a wind characteristic and at least one wind turbine state sensor for measuring a state of the wind turbine, the method including: determining or adjusting one or more wind characteristics relationships; and, performing an operation phase, the operation phase including: measuring the wind characteristics with the wind characteristics sensor, thereby obtaining measured wind characteristics; measuring the state of the wind turbine with the at least one wind turbine state sensor and determining an estimated wind characteristic from the measured state of the wind turbine and parameters of the wind turbine; comparing the estimated wind characteristics to the expected wind characteristics determined from the measured wind characteristics, wherein the expected wind characteristics is determined based on the one or more wind characteristics relationships; and, operating or shutting down the wind turbine based at least in part on the comparison result.

Accordingly, the present disclosure aims at accurately measuring wind characteristics of the wind present at the wind turbine, such as wind speed and/or wind direction and/or wind shear, the presence of turbulences in the wind flow, etc. In order to do so, a wind characteristic is measured with a wind characteristics sensor. In addition, a measurement of a state of the wind turbine, which may e.g. include a speed of the rotor and/or a torque of the rotor of the wind turbine and/or generated power of the wind turbine, is carried out with at least one wind turbine state sensor.

According to a further aspect, a wind turbine is provided wind turbine including at least one wind measurement sensor; and a wind turbine state sensor to measure a state of the wind turbine for estimating wind characteristics at the wind turbine location; a control system configured to control the wind turbine based at least in part on inputs formed by measured wind characteristics measured by the wind measurement sensor, and by measured wind turbine states measured by the wind turbine state sensor.

Further aspects, details and advantages are apparent from the following description, the accompanying drawings and the dependent claims.

BRIEF DESCRIPTION OF THE DRAWINGS

The present disclosure will be explained in view of the following exemplary drawings.

DETAILED DESCRIPTION OF THE INVENTION

Reference will now be made in detail to the various embodiments, one or more examples of which are exemplarily illustrated in the figures.

Figure 1:
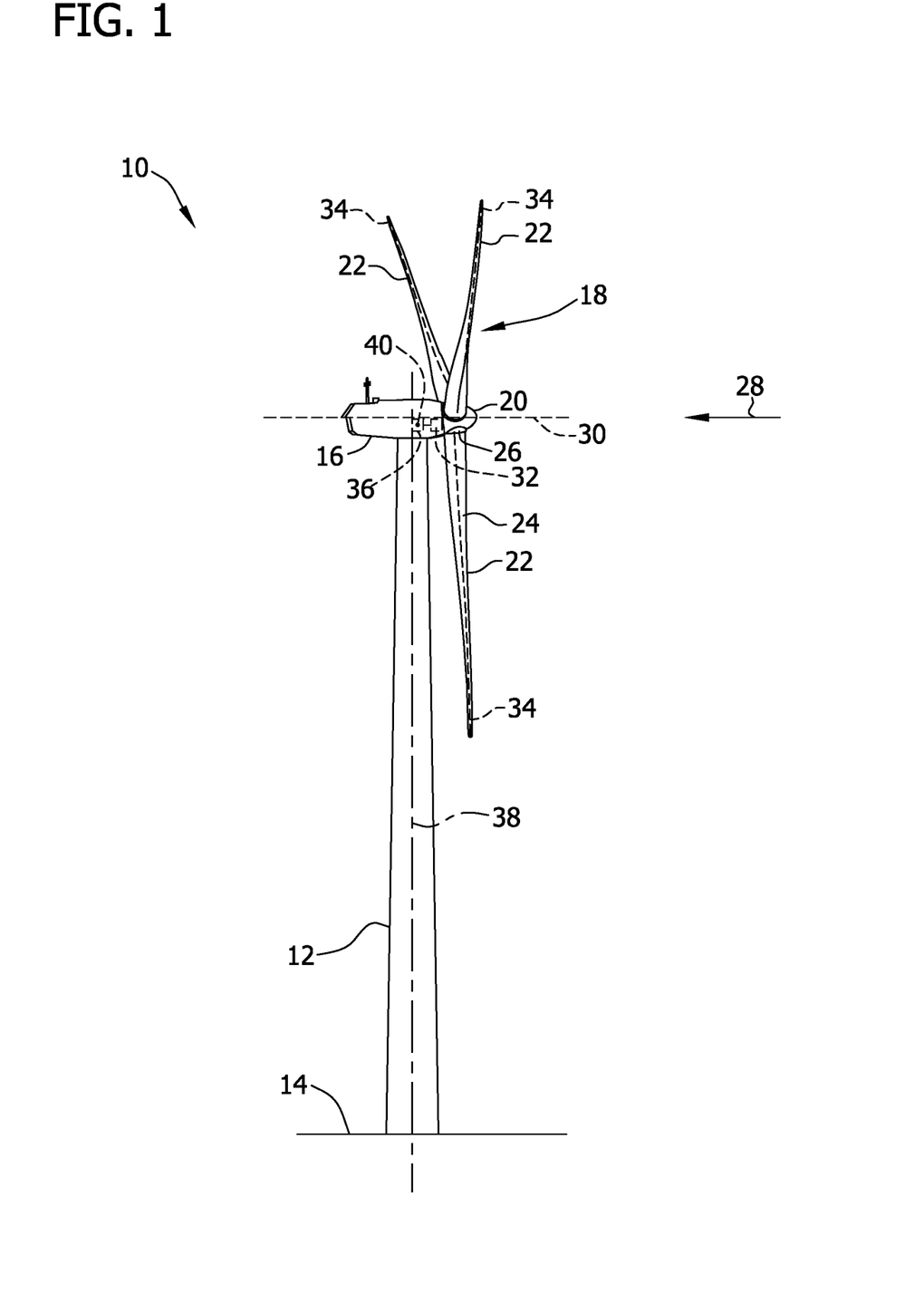
FIG. 1 shows a wind turbine with a nacelle, a rotor, and rotor blades according to embodiments of the present disclosure.

FIG. 1 shows a wind turbine 10, the wind turbine including a tower 12, placed on a support system 14, a nacelle 16, with a rotor 18, connected to a rotatable hub 20. One or more rotor blades 22 are configured to convert the kinetic energy of the wind into rotational kinetic energy of the rotor 18. Each blade has a blade root portion 24, a load transfer region 26 where the rotation is transmitted to the rotatable hub 20. When a wind component flows in the direction 28, the rotor and the rotatable hub rotate around an axis of rotation 30. Along the rotor blades 22, pitch axes 34 are shown in FIG. 1.

A control system 36, which may be located at the wind turbine like in FIG. 1 or elsewhere, is configured to control a pitch angle of the rotor blades, related to an angle of attack with respect to the wind direction, in order to control e.g. the speed or a torque of the rotor blades of the wind turbine, wherein the speed or torque are imparted to the rotor by the wind. The wind turbine further has a yaw axis 38 for orienting the rotor blades with respect to different wind directions around the tower 12. A processor 40 may be part of the control system 36.

Figure 1A:
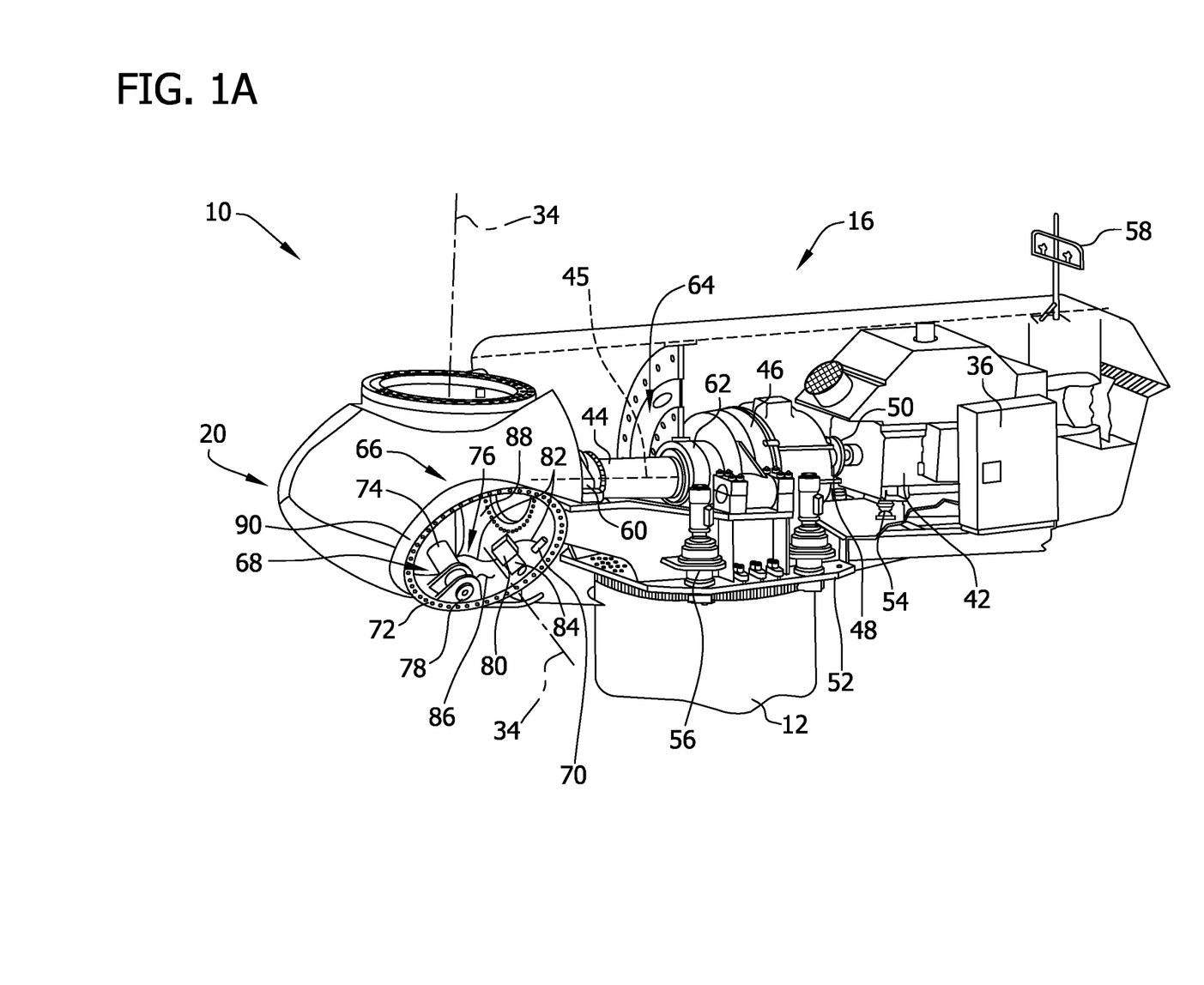
FIG. 1A shows details of a wind turbine, showing in particular a shaft of the wind turbine and a wind turbine generator according to embodiments of the present disclosure.

As shown in FIG. 1A, the nacelle 16 of the wind turbine further includes a wind turbine generator 42 for the generation of electric energy from the rotational kinetic energy of the rotor, this rotational kinetic energy results from the kinetic energy of the wind in function of the pitch angles of the rotor blades.

In the present disclosure, it is intended that wind characteristics may include one or more wind speeds, one or more wind shears, one or more temporal or spatial derivatives of wind speeds, one or more wind directions. For example, a wind characteristic may be a scalar related to an amplitude of a wind speed, for example a wind speed in the direction 28 shown in FIG. 1 at the wind turbine location. A wind characteristic may e.g. also be a vector related to a wind speed at the wind turbine location, or a set of scalars or a set of vectors related to one or more wind speeds at or near the wind turbine location, where the wind speeds may be wind speeds at a given position in space, or averaged spatial or temporal wind speeds at or near the wind turbine location. For example, wind characteristics may be described in terms of ordered tuples of real numbers related to a wind speed at or near the wind turbine location.

In some embodiments, the wind characteristics may be a magnitude of a wind speed, in particular of a scalar wind speed or of a vector describing a wind speed. For example, the wind characteristics may be measured in m/s.

In FIG. 1A further details of a wind turbine 10 are illustrated and un particular of a nacelle 16 of the wind turbine 10. In particular a rotor shaft 44 transmits the kinetic energy to the wind turbine generator for the generation of electric energy from the kinetic energy of the wind. The rotor shaft presents a longitudinal axis 45 that forms an axis of rotation of the rotor shaft. A gearbox 46 may be used in order to control a rotational speed and torque of a high speed shaft 48 driving the wind turbine generator. The wind turbine generator 42 is driven by the rotational kinetic energy of the high speed shaft 48 driven by the rotor shaft 44 through the gearbox 46 for the generation of electric energy. The rotor shaft 44 therefore transmit a rotational movement to the high speed shaft 48 through the gearbox 46, and the rotational speed of the rotor shaft 44 is typically lower than the rotational speed of the high speed shaft 48. The rotor shaft 44 is coupled to the blades of the rotor 18 of the wind turbine and when the wind imparts a rotational movement to the rotor, the rotor shaft rotates accordingly.

FIG. 1A further shows a coupling 50 between the high speed shaft 48 and the wind turbine generator 42, supports 52 and 54, a yaw drive mechanism 56 for the rotation of the nacelle around a yaw axis 38 for orienting the rotor with respect to a wind speed direction 28. A wind characteristics sensor 58 may measure a wind characteristics at the wind turbine location, e.g. a wind speed flowing in the direction 28. The wind characteristics sensor 58 of the wind turbine may be for example an anemometer. Generally, and not limited to any other feature described in relation to FIG. 1A, the anemometer of the wind turbine may be located on top of the nacelle.

Bearings 60, 62 may support the shaft or other components of the wind turbine, as shone in FIG. 1A. The wind turbine may further include a pitch assembly 66, that may include a pitch drive assembly 68 for the control of a pitch angle of one or more blades. The assembly may include sensors 70, pitch bearings 72, a pitch drive motor 74, a pitch drive gearbox 76, a pitch drive pinion 78, for one or more rotor blades.

An overspeed control system 80 may be present. Cables 82 for transmitting signals from or to a control system of the wind turbine are further indicated in FIG. 1A. Finally an actuator 84 may provide an actual pitch angle of the wind turbine blades, blades connected to the cavity 86 presenting an inner surface 88 ad an outer surface 90.

As used herein, the term "blade" is intended to be representative of any device that provides a reactive force when in motion relative to a surrounding fluid, like air forming the wind at the wind turbine location. As used herein, the term "wind turbine" is intended to be representative of any device that generates rotational energy from wind energy, and more specifically, converts kinetic energy of wind into mechanical energy. A "wind turbine generator" typically further converts the mechanical energy to electrical energy trough a wind turbine generator.

Although every commercial wind turbine is typically equipped with an anemometer on the nacelle, these anemometers are generally not used as inputs for the turbine control as their readings are too unreliable. Instead, some modern wind turbines use model-based estimation techniques to calculate the wind speed based on the performance of the turbine itself. However, these estimators rely on accurate model information to be stored in the controller or on assumptions about the wind turbine operation or the conditions affecting the wind turbine. As a consequence, the estimators cannot be used to detect abnormal turbine operations such as icing or stalling, as in these instances/situations the model parameters are no longer correct and the estimator does not report the correct wind speed anymore. Furthermore, if such an abnormal operation remains undetected the controller will control the turbine incorrectly, e.g. drive it into deep stall, which can cause additional loss of power production or even damage the wind turbine or some components of it.

Figure 1B:
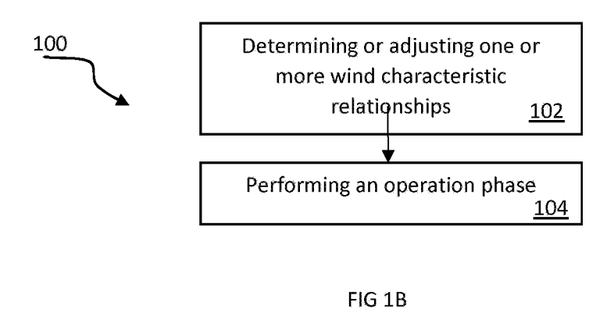
FIG. 1B illustrates a method for operating a wind turbine according to embodiments of the present disclosure.

FIG. 1B illustrates a method 100 for operating a wind turbine according to embodiments of the present disclosure. The method 100 for operating a wind turbine includes determining or adjusting 102 one or more wind characteristic relationships, and performing 104 an operation phase.

As used herein, a sensor for measuring wind characteristics may in particular be a wind turbine anemometer. Methods of the present disclosure allow in particular to calibrate the wind turbine anemometer or a sensor for measuring wind characteristics, and the measured wind speed of the wind turbine anemometer or of the sensor for measuring wind characteristics becomes a more reliable and usable quantity for the control and the monitoring of the wind turbine system. Modeled wind is reliable if the wind turbine operates in normal undisturbed conditions. If the wind turbine does operate offline or in a stall or disturbed condition, the wind speed obtained based on models may be wrong and thus the turbine may not be operated at its optimum operating parameters or may be even exposed to damage.

The present disclosure provides a highly accurate redundant wind speed measurement that will be used to detect e.g. blade icing, blade failures and other turbine abnormalities or disturbed conditions detectable through wind speed deviations. In some embodiments, also a significant or deep stall condition is detectable. During non-operational times of the wind turbine and/or during a stall or disturbed condition of the wind turbine, the wind speed measurement by the wind characteristics sensor, e.g. the anemometer, typically is much more accurate. Therefore, the wind speed measured by a wind characteristics sensor or anemometer may be used during a stall or disturbed condition in place of the wind speed obtained/estimated with the use of models for an accurate control or in order to prevent damages, provided that e.g. a systematic error affecting the wind speed measurement obtained by the wind characteristic sensor, e.g. an anemometer, is handled properly. This allows furthermore for possible power calculations, improved accuracy and performance of a return into operation after e.g. a calm or a storm condition, etc. Methods of the present disclosure also enable the possibility of power curve measurements based on e.g. nacelle anemometry.

When for example an anemometer is calibrated against a met mast, severe drawbacks are present. E.g. due to the distance between the met mast and the turbine the correlation between the wind characteristics at the two locations is not or not always good. Furthermore, this type of calibration is only applicable to specific wind turbines. For turbines without a met mast, such a calibration taken e.g. from another turbine may not be applicable and/or a significant variability in function of factors like e.g. the local terrain configuration may affect the quality or reliability of the calibration. When using wind speed measurement equipment that measures wind characteristics in front of the rotor, such as e.g. a LIDAR, a calibration may be less necessary. However, devices like LIDARs tend to be expensive.

As used herein, it is intended that the state of the wind turbine may e.g. include a rotor speed and/or a generated electrical power by the wind turbine generator and/or a torque of the rotor and/or the rotor shaft. It is intended that parameters for the wind turbine operation may e.g. include pitch angles of blades of the wind turbines or e.g. a torque of a generator of the wind turbine and/or a configuration of a gearbox of the wind turbine. Parameters are assumed to be known quantities.

Wind characteristics may include one or more wind speeds, one or more wind directions, one or more wind accelerations at one or more locations at or near the wind turbine location, and/or wind turbulence. It is intended that both wind characteristics and wind turbine states and parameters may be one or more scalar and/or one or more vectors describing one or more quantities.

Wind characteristics at the wind turbine location may be measured using different types of sensors It may be possible to use a wind measurement mast positioned at some distance from the wind turbine, e.g. upstream of the wind turbine. The value of the wind characteristics measured at the measurement mast may however be different from the values at the wind turbine location, e.g. the surrounding terrain and/or objects may produce a significant difference of values of wind characteristics measured at the mast with respect to wind characteristics at the wind turbine location.

When measuring the wind characteristics at the wind turbine location with a local wind characteristic sensor, such as an anemometer placed at the wind turbine, the measurement is typically affected by an error, e.g. a systematic error, due to the presence of the wind turbine and the wind turbine blades themselves. Therefore, the value of wind characteristics measured by a local sensor at the wind turbine location, e.g. by an anemometer located at the wind turbine, cannot be used directly for determining the real wind characteristics at the wind turbine location due to the effects of the presence of the wind turbine and the wind turbine blades themselves.

Under nominal circumstances, it is beneficial to use the wind turbine itself as a measurement instrument for determining wind characteristics at the wind turbine location. Knowing actual relevant operational parameters of the wind turbine, such as the pitch angles of the blades, under nominal circumstances, the state of the wind turbine, e.g. a rotor speed and/or the power output, correlates with the wind characteristics at the wind turbine location, e.g. with a local wind speed. It is therefore possible to estimate the wind characteristics from a state of the wind turbine, given actual known values of parameters of the wind turbine. Therefore, under nominal circumstances, the wind turbine itself may replace sensors for measuring wind characteristics at the wind turbine location. But, if a stall condition occurs, e.g. a significant or deep stall condition, or a disturbed condition, e.g. in the presence of ice or dirt on the blades, the wind turbine may not be used anymore for estimating wind characteristics, given that a correlation between the true actual wind characteristics and a state of the wind turbine for actual values of parameters, such as pitch angles, becomes irregular or chaotic or unreliable or affected by significant errors.

Therefore, it is beneficial to detect a stall or a disturbed condition without relying on the wind characteristics estimated from a state of the wind turbine, but also avoiding a situation where only a wind characteristic sensor, like e.g. an anemometer, is used directly, given that the wind characteristics sensor is typically affected by significant systematic or statistical errors.

Detecting a stall or a disturbed condition is beneficial for operating a wind turbine e.g. for avoiding damages to the wind turbine and/or for improving the delivery of output power.

Some type of sensors, like LIDARs, may be able to measure wind characteristics in the proximity of a wind turbine, that can be used for determining reliably wind characteristics at the wind turbine location with sufficient accuracy and precision, however LIDARs may be expensive or unpractical at least under some circumstances.

It is therefore beneficial to calibrate a wind characteristic sensor, e.g. a local anemometer, at the wind turbine location in order to overcome the systematic errors introduced by the presence of the wind turbine that typically affect said wind characteristic sensor.

It is furthermore beneficial to compare wind characteristics estimated from a measured state of the wind turbine, under consideration of operational parameters, with the wind characteristics obtained by the calibrated wind characteristics sensor. Under normal circumstances, the wind characteristics estimated from the measured state of the wind turbine are more reliable and accurate, but nevertheless the value of the wind characteristics obtained with the calibrated wind characteristics sensor is close to the value of the estimated wind characteristics. That is, both values are comparable, whereas without calibration the wind characteristics sensor is affected by a significant error, but the estimated wind characteristics value will be typically more precise and accurate under normal circumstances.

Under a significant stall condition or a disturbed condition the wind characteristics estimated from the measured state of the wind turbine may be erroneous and may be significantly different from the values of the wind characteristics obtained with the calibrated wind characteristics sensor. Therefore, the values obtained by the calibrated wind characteristics sensor may be used for a plausibility check of the wind characteristics estimated from the measured state of the wind turbine.

Comparing wind characteristics obtained from a measured state of the wind turbine with wind characteristics obtained with the calibrated wind characteristics sensor is beneficial in particular in order to detect a stall and a disturbed condition of the wind turbine. In particular, a comparison may be based on a difference between the estimated wind characteristics based on a measured state of the wind turbine and the wind characteristics obtained with the calibrated sensor for measuring wind characteristics, e.g. a calibrated anemometer. Without calibration, a significant error may affect the wind characteristics sensor, e.g. the anemometer and therefore the measurement can be erroneous.

Figure 2:
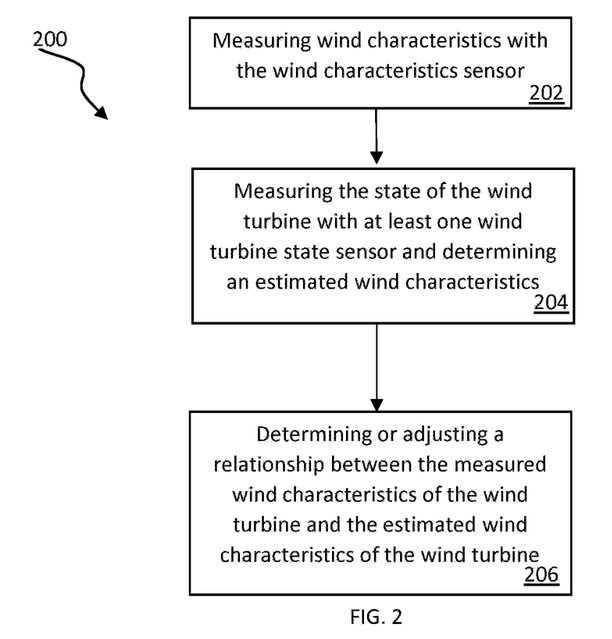
FIG. 2 illustrates determining or adjusting one or more wind characteristics relationships according to methods of the present disclosure.

In FIG. 2, a calibration phase of a method for operating a wind turbine is illustrated according to some embodiments of the present disclosure. In particular FIG. 2 illustrates how a relationship of one or more wind characteristic relationships is determined or adjusted. As used herein, the term "calibration phase" may therefore refer to the determination or adjustment of one or more wind characteristics relationships, i.e. a determination or adjustment 200 of one or more wind characteristics relationship is performed in a calibration phase. A wind characteristics relationship may be implemented by any data structure capable of associating information on wind characteristics to other information on wind characteristics. For example, a wind characteristic relationship may be a transfer function that associates to a vector, e.g. to a vector describing measured wind characteristics, another vector, e.g. a vector describing estimated expected wind characteristics. A wind characteristic relationship may also be implemented as a set of ordered pairs of vectors, wherein for each ordered pair the first component is a vector related to e.g. measured wind characteristics and the second component is a vector related to e.g. expected estimated wind characteristics. The expected estimated wind characteristics may form an expected value for wind characteristics estimated with the use of physical models of the wind turbine based e.g. at least in part on a measured state of the wind turbine.

A calibration phase for determining or adjusting one or more wind characteristic relationships may include measuring 202 wind characteristics with the wind characteristics sensor of the wind turbine, e.g. with the wind characteristics sensor 58 of FIG. 1A, thereby obtaining wind characteristics data, measuring 204 the state of the wind turbine with at least one wind turbine state sensor and determining an estimated wind characteristics of the wind turbine from the measured state of the wind turbine and parameters of the wind turbine. The wind turbine state sensor, may e.g. in particular measure a rotational speed of the rotor shaft 44 of the wind turbine.

Further parameters, like e.g. a pitch angle of one or more rotor blades, may be considered for the determination of the estimated wind characteristics. It is intended that the estimated wind characteristics are based in particular on a physical model of the wind turbine. As shown in FIG. 2, a calibration phase may further includes determining or adjusting 206 a relationship between the measured wind characteristics of the wind turbine and the estimated wind characteristics of the wind turbine. The relationship may in particular be based upon measured wind characteristics and/or estimated wind characteristics and of a historical sequence of said characteristics stored in a convenient data structure, e.g. in a list of ordered pairs stored e.g. in a memory of the control system 36 and/or of the processor 40. It is intended that the relationship in block 206 may be identified with e.g. a transfer function.

Wind characteristics measured by the wind characteristics sensor 58 of the wind turbine, e.g. by a local anemometer, are indicated with the symbol $w_{measured}$. With the symbol $s_{turbine}$ a state of the wind turbine and with the symbol $p_{turbine}$ operational parameters of the wind turbine are indicated respectively.

It is intended that $w_{measured}$, $s_{turbine}$, $p_{turbine}$ may be scalars or vectors. In some alternative embodiments these quantities may alternatively refer to a wind turbine of the same type or to quantities related to a simulation of the wind turbine.

The state $s_{turbine}$ of the wind turbine may include e.g. rotor speed, rotor torque and/or e.g. a rotational speed of the rotor shaft 44 of the wind turbine and/or a torque of the rotor shaft 44 and/or a power output of the wind turbine generator 42. It is intended that an estimation of wind speed characteristics at the wind turbine location is possible when the state of the wind turbine is measured, possibly with the consideration of the operational parameters of the wind turbine that are assumed to be known.

The operational parameters $p_{turbine}$ may include e.g. pitch angles of the rotor blades, a torque parameter of the wind turbine generator, the actual configuration of a gearbox, etc.

Knowing the state $s_{turbine}$ of the wind turbine and the operational parameters $p_{turbine}$ of the wind turbine it is possible to estimate wind characteristics at the wind turbine location. The estimated wind characteristics in function of the state and the parameters of the wind turbine are indicated with $$w_{estimated} = w_{estimated}(s_{turbine}, p_{turbine})$$

It is intended that $w_{measured}$ and $w_{estimated}$, may be scalars or vectors and that they can be compared to each other with the use of e.g. a suitable metric, such as an Euclidean distance between scalars or vectors. The computation of $w_{estimated}(s_{turbine}, p_{turbine})$ may be in particular based on model based estimation techniques and in particular on the use of physical models of e.g. the wind turbine and/or of wind turbine components.

In some alternative embodiments where $s_{turbine}$, $p_{turbine}$ relate to a wind turbine of the same type, $w_{estimated}$ also relates to a wind turbine of the same type. In some alternative embodiments where $s_{turbine}$, $p_{turbine}$ relate to a simulation of the wind turbine, $w_{estimated}$ also relates to a simulation of the wind turbine.

Assuming that the operational parameters of the wind turbine $p_{turbine}$ are known, for brevity it is stated that an estimation of wind characteristics at the wind turbine location is obtained from a state $s_{turbine}$ of the wind turbine, and equivalently it may be written that $w_{estimated} = w_{estimated}(s_{turbine})$ assuming implicitly the dependency on $p_{turbine}$, with $p_{turbine}$ known.

When a significant stall or disturbed condition is not present, $w_{estimated}$ may be a good estimate of the actual wind characteristics at the wind turbine location, whereas in a significant stall or disturbed condition $w_{estimated}$ may deviate significantly from the true value of the wind characteristics at the wind turbine location.

On the other side, $w_{measured}$ may be affected by a significant error, and in particular by a systematic error due to the presence of the wind turbine or the wind turbine blades.

If it is determined that the wind turbine is operating in a regular condition, i.e. not in significant stall condition and not in a disturbed condition, the sensor for measuring $w_{measured}$ may be calibrated using the information obtained from $w_{estimated}$, in order to account for the systematic error that affects $w_{measured}$.

In order to eliminate or at least mitigate the systematic error that affects $w_{measured}$, in a calibration phase values of $w_{measured}$ and values of $s_{turbine}$ may be measured repeatedly at different time instants $t_1, t_2, \ldots, t_n$. In this case, it is assumed that also values of $p_{turbine}$ are known at the time instants $t_1, t_2, \ldots, t_n$. Then, in some embodiments, a sequence S of ordered pairs is determined $$S = \begin{pmatrix} (w_{measured}(t_1), w_{estimated}(s_{turbine}(t_1), p_{turbine}(t_1))), \\ (w_{measured}(t_2), w_{estimated}(s_{turbine}(t_2), p_{turbine}(t_2))), \\ \ldots \\ (w_{measured}(t_n), w_{estimated}(s_{turbine}(t_n), p_{turbine}(t_n))) \end{pmatrix}$$

Where $w_{measured}(t_i)$ indicates the value of $w_{measured}$ at time instant $t_i$, $s_{turbine}(t_i)$ indicates the value of $s_{turbine}$ at time instant $t_i$ and $p_{turbine}(t_i)$ indicates the value of $p_{turbine}$ at time instants $t_i$, for $i=1, \ldots, n$.

Assuming that $p_{turbine}$ is known, it is written for compactness $$S = \begin{pmatrix} (w_{measured}(t_1), w_{estimated}(s_{turbine}(t_1))), \\ (w_{measured}(t_2), w_{estimated}(s_{turbine}(t_2))), \\ \ldots \\ (w_{measured}(t_n), w_{estimated}(s_{turbine}(t_n))) \end{pmatrix}$$

And for even more compactness it is written $$S = \begin{pmatrix} (w_{measured}(t_1), w_{estimated}(t_1)), \\ (w_{measured}(t_2), w_{estimated}(t_2)), \\ \ldots \\ (w_{measured}(t_n), w_{estimated}(t_n)) \end{pmatrix}$$

With $w_{estimated}(t_i) = w_{estimated}(s_{turbine}(t_i)) = w_{estimated}(s_{turbine}(t_i), p_{turbine}(t_i))$ for $i=1, \ldots, n$.

In some embodiments, the time instants $t_i$ may identify time intervals of fixed or variable length and $w_{measured}(t_i)$ may be an average measured wind speed over the time interval identified by $t_i$. For example $w_{measured}(t_i)$ may be an average measured wind speed of wind speeds during an interval related to $t_i$, e.g. during an interval $[t_i-66_t, t_i]$ with $\Delta_t$ a predetermined time delay. For example $w_{measured}(t_i)$ may be a moving average, like a simple moving average or an exponential moving average at time instant $t_i$ of instantaneous wind speeds. It is intended that in these embodiments also $w_{estimated}(t_i)$ may be an average estimated wind speed over the time interval identified by $t_i$, e.g. over the interval $[t_i-\Delta_t, t_i]$ and/or that $w_{estimated}(t_i)$ may also be a moving average, like e.g. a simple moving average or exponential moving average, in particular a moving average with an identical or similar sample window as the moving average identified by $w_{measured}(t_i)$.

In some embodiments, the sequence of ordered pairs S can be used in order to determine a relationship between measured and estimated wind characteristics at the wind turbine location. The relationship may be e.g. a transfer function and may be stored in a memory of e.g. a local controller or processor of the wind turbine or elsewhere.

In some embodiments, a relationship between the measured wind characteristics and the estimated wind characteristics may be obtained by other means, e.g. using at least in part interpolation and/or regression analysis and/or Monte Carlo methods, based on measurements of $w_{measured}$ and computations of $w_{estimated}$ based at least in part on the state $s_{turbine}$ of the wind turbine. In some embodiments, interpolation and/or regression analysis and/or Monte Carlo methods may be based on S.

In some alternative embodiments, the relationship between measured wind characteristics and estimated wind characteristics may be obtained in a similar way and in particular based on a sequence of ordered pairs $$S = \begin{pmatrix} (w_{measured}(t_1), w_{estimated}(t_1)), \\ (w_{measured}(t_2), w_{estimated}(t_2)), \\ \ldots \\ (w_{measured}(t_n), w_{estimated}(t_n)) \end{pmatrix}$$

obtained as described, but wherein the measured wind characteristics $w_{measured}(t_i)$ and the measured state and parameters $s_{turbine}(t_i)$, $p_{turbine}(t_i)$ of the wind turbine are related to a wind turbine of the same type of the wind turbine. Therefore in some embodiments $w_{measured}(t_i)$ and $w_{estimated}(t_i)$ are related to a wind turbine of the same type of the considered wind turbine, and the relation S is based on the wind turbine of the same type. Therefore, in some embodiments of the present disclosure, relations based on S are based on a wind turbine of the same type.

In yet other alternative embodiments, the sequence of ordered pairs S may be obtained by a simulation of the wind turbine and therefore a relationship between measured wind characteristics and estimated wind characteristics based on S may be obtained by simulation.

It is intended that values in S are not based on a significant stall condition or disturbed condition of the wind turbine, i.e. for all time instants or time intervals $t_1, t_2, \ldots, t_n$, the wind turbine is not in a significant stall condition or disturbed condition. In embodiments in which a wind turbine of the same type of the wind turbine is considered for obtaining S, it is intended that the wind turbine of the same type is not in a significant stall condition or disturbed condition for all time instants or time intervals $t_1, t_2, \ldots, t_n$. In embodiments where S is obtained by simulation, a significant stall condition or disturbed condition of the wind turbine is not simulated and for all simulated time instants or time intervals $t_1, t_2, \ldots, t_n$, a significant stall condition or disturbed condition of the wind turbine is not simulated.

Increasing the number n of time instants $t_1, t_2, \ldots, t_n$ in a calibration phase under various wind characteristics, the number of ordered pairs in the sequence S increases and for each possible output $\omega$ of the sensor for measuring wind characteristics at the wind turbine location, e.g. for each possible output $\omega$ of the anemometer, typically either some pairs in the sequence S have $\omega$ as the first component, or have a first component that is close to $\omega$. In some embodiments, interpolation or regression may be alternatively used for obtaining missing data.

Let $T[\omega] = \{t_i | w_{measured}(t_i) \cong \omega\}$ be the set of time instants for which $w_{measured}$ is equal to or close to $\omega$, with $\omega$ a possible output of the sensor for measuring wind characteristics, e.g. a local anemometer. The set $T[\omega]$ is an ordered set and it can be written $T[\omega] = \{t_{\omega,1}, t_{\omega,2}, \ldots\}$.

The symbol $\cong$ indicates equality or quasi equality where two scalars or vectors are considered to be equal or quasi equal if their distance according to a suitable metric is below a fixed bound. This fixed bound may be determined based upon the characteristics of the sensor for measuring wind characteristics, e.g. upon a variance affecting the outputs of said sensor and/or upon the tolerance of components or parts included in the wind turbine.

Let $S[\omega]$ be the subsequence of S containing exactly those pairs in S for which the first component is equal to $\omega$ or close to $\omega$. For sufficiently large n, the subsequence $S[\omega]$ is expected to be nonempty and will contain in an ordered way all ordered pairs in the sequence S having as first component a value equal to or close to $\omega$, i.e.

$$S[\omega] = ((w_{measured}(t_{\omega,1}), w_{estimated}(t_{\omega,1})), (w_{measured}(t_{\omega,2}), w_{estimated}(t_{\omega,2})), \ldots) \text{ with } w_{measured}(t_{\omega,1}) \cong \omega, w_{measured}(t_{\omega,2}) \cong \omega, \ldots$$

An expected value $E_{estimated}(\omega)$ is then associated to $S[\omega]$, as an expected value of the sequence $S_{estimated}[\omega] := (w_{estimated}(t_{\omega,1}), w_{estimated}(t_{\omega,2}), \ldots)$ obtained from $S[\omega]$ replacing the ordered pairs in $S[\omega]$ by their second components. The expected value $E_{estimated}(\omega)$ may e.g. be an arithmetic average, or a geometric average or a median of the sequence $(w_{estimated}(t_{\omega,1}), w_{estimated}(t_{\omega,2}), \ldots)$. In some alternative embodiments $E_{estimated}(\omega)$ may be obtained from S by interpolation or regression.

Therefore, the expected value $E_{estimated}(\omega)$ forms an expected value for $w_{estimated}$ when the output value of the wind characteristic sensor measuring a wind characteristics at the wind turbine location is or is close to $\omega$, e.g. when an anemometer outputs $\omega$ or a value close to $\omega$. The expected value $E_{estimated}(\omega)$ is an expected wind characteristic value for the estimated wind characteristics, determined from the measured wind characteristics, and is determined based on the sequence S. The notation $E_{estimated}$ remarks that an expected value of the estimated wind characteristics is indicated. Therefore, E indicates the expectation. In alternative embodiments where a wind turbine of the same type is used, $E_{estimated}(\omega)$ is related to the wind turbine of the same type, i.e. $\omega$ refers to a possible output of e.g. an anemometer or wind characteristics sensor of the wind turbine of the same type. In alternative embodiments where a wind turbine is simulated, $E_{estimated}(\omega)$ is related to the simulated wind turbine, i.e. $\omega$ refers to a possible output of e.g. a simulated anemometer or simulated wind characteristics sensor of the simulated wind turbine.

S and/or $S[\omega]$ and/or $S_{estimated}[\omega]$ and/or $E_{estimated}(\omega)$ may be stored as functions of $\omega$ with the use of any suitable data structure and on any suitable device and/or medium and/or with the use of any suitable system. In particular vectors containing pairs or vectors containing pairs of scalars or pairs of vectors or lists containing pairs or lists containing pairs of scalars or pairs of vectors or hash tables, or any nested combination of said data structures may be used, wherein said data structures may be stored on and manipulated by any suitable memory or computer or medium, either remotely or locally at the wind turbine location. Related data may be transmitted on e.g. a network or a transmission line, on one or more cables and/or on one or more waveguides or with the use of a wireless communication system. The data structures may be stored permanently or only for a required time interval, e.g. data structures implementing instances of S and/or $S[\omega]$ and/or $S_{estimated}[\omega]$ may be deleted once an instance of $E_{estimated}(\omega)$ is obtained e.g. in a calibration phase considering the wind turbine or a wind turbine of the same type or a simulated wind turbine.

It is intended that $E_{estimated}$ may form a transfer function from the wind speed measured using the wind characteristics sensor, e.g. an anemometer installed on the wind turbine, to the expected wind speed estimated from the turbine behavior. In alternative embodiments where a wind turbine of the same type is used, it is assumed that $E_{estimated}$ for the wind turbine of the same type is identical or close to the result that would be obtained for $E_{estimated}$ on the actual physical wind turbine. In alternative embodiments where a wind turbine is simulated, it is assumed that $E_{estimated}$ for the simulated wind turbine is identical or close to the result that would be obtained for $E_{estimated}$ on the actual physical wind turbine.

The transfer function $E_{estimated}$ may in particular be generated from S considering situations where the wind turbine is known to be operating at or near the optimum, e.g. during wind turbine validation and where a significant stall condition and a disturbed condition are not present.

In some embodiments of the present disclosure, in a calibration phase, one or more transfer functions $E_{estimated,1}, E_{estimated,2}, \ldots, E_{estimated,v}$ may be obtained, with $v \geq 1$, the one or more transfer functions forming a finite sequence $$E_{estimated,SEQ} = (E_{estimated,1}, E_{estimated,2}, \ldots, E_{estimated,v}).$$

of transfer functions. Some transfer functions in the sequence $E_{estimated,SEQ}$ may be based on measurements related to the wind turbine, some other transfer functions in $E_{estimated,SEQ}$ may be obtained based on measurements related to a wind turbine of the same type of the wind turbine. Yet other transfer functions in $E_{estimated,SEQ}$ may be obtained based on simulations of the wind turbine, i.e. measurements are replaced by simulations based e.g. on physical models of the wind turbine. Also, different relationships in the sequence $E_{estimated,SEQ}$ may be related to different time periods, when e.g. calibration phases are repeated. Different transfer functions, e.g. obtained with measurements and/or simulations, e.g. related to the wind turbine or a wind turbine of the same type, may be combined in order to form a single transfer function in the sequence $E_{estimated,SEQ}$. The combination may e.g. be based on averaging, weighted averaging, interpolation, etc. Furthermore, in embodiments where a sequence $E_{estimated,SEQ}$ is obtained, an overall transfer function $E_{estimated}$ may be obtained from the sequence $E_{estimated,SEQ}$, e.g. by averaging $$E_{estimated}(\omega) = \text{AVERAGE}((E_{estimated,1}(\omega), E_{estimated,2}(f), \ldots, E_{estimated,v}(\omega)))$$

for any value ω in the domain of the transfer functions in the sequence, and where AVERAGE may indicate any average, e.g. a weighted average wherein e.g. more recently obtained transfer function receive a greater weight in the averaging operation. AVERAGE may also indicate for example an arithmetic mean or a geometric mean or a median. Missing data for some ω may, in some embodiments, be obtained e.g. by interpolation or regression.

In some embodiments, $E_{estimated}(\omega)$ identifies a transfer function, i.e. a relationship between measured wind characteristics and the expected estimated wind characteristics. A value $w_{estimated}$ of estimated wind characteristics is in relation with a measured value $w_{measured}$ of wind characteristics considering $E_{estimated}$, if and only if $w_{estimated} = E_{estimated}(w_{measured})$ holds. It is intended that the relation $E_{estimated}$ forms a transfer function. It is intended therefore that the transfer function $E_{estimated}$ identifies a relationship between the measured wind characteristics $w_{measured}$ and the estimated wind characteristics $w_{estimated}$.

In some embodiments a transfer function $E_{estimated}$ identifying a relationship between the measured wind characteristics $w_{measured}$ and the estimated wind characteristics $w_{estimated}$ may be obtained by other means, e.g. using at least in part interpolation and/or regression analysis and/or Monte Carlo methods, based on measurements of $w_{measured}$ and computations of $w_{estimated}$ based at least in part on the state $s_{turbine}$ of the wind turbine.

In some alternative embodiments $E_{estimated}$ is alternatively obtained considering a wind turbine of the same type or a simulated wind turbine.

A calibration phase for determining or adjusting 200 one or more wind characteristic relationships, i.e. $E_{estimated}$ and/or $E_{estimated,SEQ}$, takes place when it is known that a significant stall condition or a disturbed condition of the wind turbine is not present, therefore during calibration $w_{estimated}$ is close to the actual value of the wind characteristics at the wind turbine. When a relationship is determined or adjusted according to block 206, the relationship may be $E_{estimated}$ or a relationship in the sequence $E_{estimated,SEQ}$.

In some embodiments, in a calibration phase, a wind turbine with a wind speed estimator as part of its controller software may be run in an environment where it is known that the estimator performs as expected, i.e. where $w_{estimated}$ is close to an actual wind condition at the wind turbine location. For example, it is ensured that the blades are clean, and e.g. an anemometer forming the wind characteristics sensor of the wind turbine is functioning correctly. During said calibration phase the data from e.g. the turbine anemometer, i.e. $w_{measured}$, and the data from the wind speed estimator, i.e. the $w_{estimated}$ is collected and a transfer function $E_{estimated}$ between values of $w_{measured}$ and values of $w_{estimated}$ is computed, e.g. as described above for some embodiments of the present disclosure. The transfer function $E_{estimated}$ allows the calculation of the expected output from the estimator based on the wind speed measured by e.g. the anemometer, i.e. $E_{estimated}(w_{measured})$ is expected to be close to $w_{estimated}$.

Figure 3:
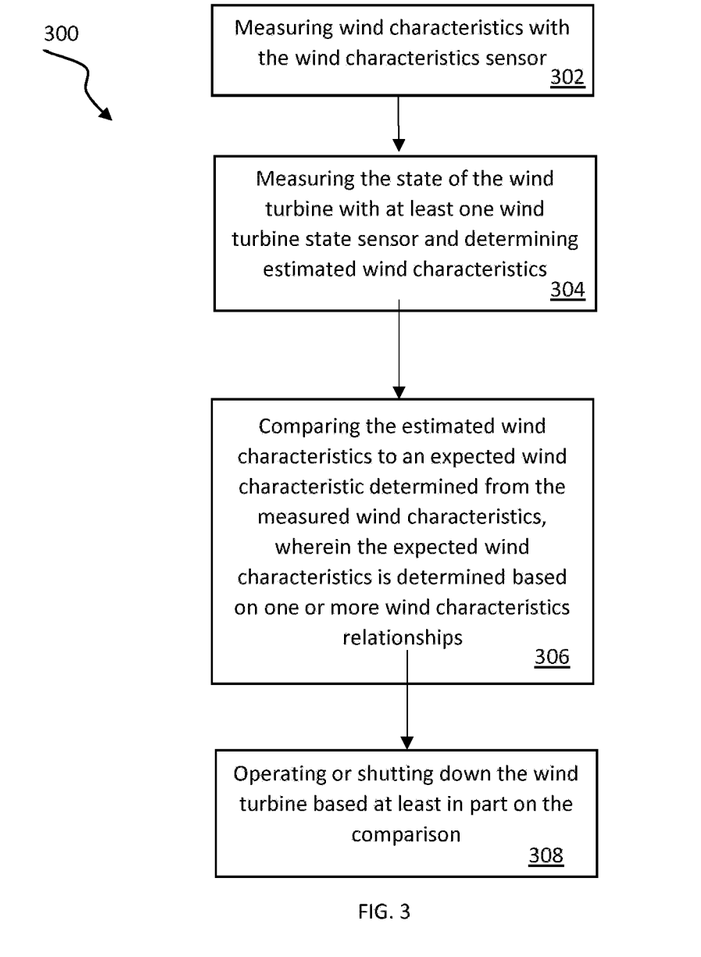
FIG. 3 illustrates an operation phase of a method for operating a wind turbine according to embodiments of the present disclosure.

FIG. 3 shows an operation phase 300 of a method for operating a wind turbine according to some embodiments of the present disclosure, the operation phase including measuring 302 wind characteristics with the wind characteristic sensor, e.g. with the wind characteristics sensor 58, thereby obtaining wind characteristics data; measuring 304 the state of the wind turbine with at least one wind turbine state sensor and determining estimated wind characteristics from the measured state of the wind turbine and parameters of the wind turbine.

The operation phase 300 further includes comparing 306 the estimated wind characteristics to an expected wind characteristic determined from the measured wind characteristics, wherein the expected wind characteristics is determined based on the one or more wind characteristics relationships, i.e. $E_{estimated}$ and/or $E_{estimated,SEQ}$, e.g. based on one or more relationships between wind characteristics determined or adjusted 200 in one or more calibration phases, as indicated e.g. by the block 206. The operation phase 300 further includes operating or shutting down 308 the wind turbine based at least in part on the comparison. A relationship determined or adjusted 206 as described in FIG. 2 may form $E_{estimated}$ or an element/component in the sequence $E_{estimated,SEQ}$ from which the expected wind characteristics is determined in function of the measured wind characteristics $w_{measured}$, measured according to block 302.

During the operation phase, i.e. in particular when a calibration phase is not performed, when the wind characteristics sensor for measuring a wind characteristics outputs a value $w_{measured}$, an expected value $E_{estimated}(w_{measured})$ determined e.g. based on the relationship $E_{estimated}$ or on the sequence $E_{estimated,SEQ}$ obtained in one or more calibration phase gives an expected value of $w_{estimated}$.

The expected value $E_{estimated}(w_{measured})$ function of $w_{measured}$ therefore mitigates the errors that directly affect $w_{measured}$ and, at least if a significant stall condition and a disturbed condition of the wind turbine are not present, the expected value $E_{estimated}(w_{measured})$ approximates $w_{estimated}$ that is as described close to the real wind characteristics at the wind turbine, whereas $w_{measured}$ directly is typically affected by a significant error and differs significantly from $w_{estimated}$ and therefore from the true wind characteristics.

After a calibration, during an operation phase the measured wind characteristics $w_{measured}$ are used for obtaining an expected wind characteristic value determined from the measured wind characteristics $w_{measured}$, the expected value being e.g. $E_{estimated}(w_{measured})$ based on $E_{estimated}$. Whenever e.g. $E_{estimated}(w_{measured})$ differs significantly from $w_{estimated}$ something unexpected may be occurring, and in particular a significant stall condition or a disturbed condition of the wind turbine may occur that causes the two values to be significantly different.

It is therefore beneficial to operate the wind turbine during an operation phase based on the comparison of e.g. $E_{estimated}$ ($w_{measured}$) with $w_{estimated}$. In particular the operation phase may follow one or more calibration phases. When e.g. $E_{estimated}(w_{measured})$ is close to $w_{estimated}$ a significant stall condition or a disturbed condition of the wind turbine may be absent and the wind turbine is operated according to $w_{estimated}$, i.e. according to $w_{estimated}=w_{estimated}(s_{turbine})=w_{estimated}(s_{turbine}, p_{turbine})$, because the wind characteristic estimated from a state $s_{turbine}$ of the wind turbine and/or from a state $s_{turbine}$ of the wind turbine together with parameters $p_{turbine}$ of the wind turbine is more accurate than the wind characteristic $w_{measured}$ measured by a wind characteristics sensor and also than the expected wind characteristics, e.g. $E_{estimated}(w_{measured})$.

In some embodiments, if the expected wind characteristics, e.g. $E_{estimated}(w_{measured})$, differs significantly from $w_{estimated}$, e.g. when a value of a magnitude of a difference between e.g. $E_{estimated}(w_{measured})$ and $w_{estimated}$ is above a predetermined threshold, e.g. a threshold between 0.5 m/s and 2 m/s, then the wind turbine is likely in a significant stall condition or in a disturbed condition and therefore the wind turbine may e.g. be operated according to $E_{estimated}(w_{measured})$, because the value $w_{estimated}$ is in this case typically unreliable and inaccurate whereas $E_{estimated}(w_{measured})$ being based on $w_{measured}$ may possibly be more accurate. Alternatively and/or in dependence of the magnitude of the difference, the wind turbine may be shut off completely in order to prevent possible damage to the wind turbine. If $E_{estimated}(w_{measured})$ differs significantly from $w_{estimated}$ the wind turbine may therefore be shut off or halted or operated in a very conservative way to prevent damage, e.g. when a value of a magnitude of a difference between $E_{estimated}(w_{measured})$ and $w_{estimated}$ is above a predetermined threshold, e.g. a threshold between 0.5 m/s and 2 m/s. In some embodiments said threshold may be any value greater than e.g. 0.5 m/s.

In some embodiments, during operation of the wind turbine after the calibration phase has been completed, the turbine constantly calculates the expected wind speed $E_{estimated}(w_{measured})$ in regular intervals, e.g. in real time or near-real time, or e.g. hourly, daily, or weekly. If the expected estimated wind speed $E_{estimated}(w_{measured})$ and the model-based estimated wind speed $w_{estimated}$ differ by more than a certain threshold, e.g. a threshold between 0.5 m/s and 2 m/s, several actions might be taken, according to embodiments of the present disclosure. In one embodiment, a turbine controller of the wind turbine switches to use the expected estimated wind speed $E_{estimated}(w_{measured})$ obtained from $w_{measured}$, e.g. from a local anemometer, instead of the model-based estimate $w_{estimated}$ as an input to the main controller. In some embodiments, a message will be generated indicating that the turbine needs to be inspected. In some embodiments, a turbine will switch to a safer mode of operation that protects it from potential damage due to certain conditions such as an increased pitch angle to avoid stall. In some embodiments, the pattern of the mismatch between expected value $E_{estimated}(w_{measured})$ and actual value $w_{estimated}$ is compared against pre-computed or pre-determined fault patterns stored in a software or a memory related to the wind turbine or the wind turbine controller and, in some embodiments, an action is taken based on the particular fault pattern.

More generally; embodiments of the present disclosure relate to a method for operating a wind turbine, the wind turbine including a wind characteristics sensor for measuring a wind characteristic $w_{measured}$ and at least one wind turbine state sensor for measuring a state $s_{turbine}$ of the wind turbine, the method comprising: determining or adjusting one or more wind characteristics relationships, i.e. a relationship $E_{estimated}$ or a sequence of relationships $E_{estimated,SEQ}$; and, performing an operation phase, the operation phase including: measuring the wind characteristics with the wind characteristics sensor, thereby obtaining measured wind characteristics $w_{measured}$; measuring the state $s_{turbine}$ of the wind turbine with the at least one wind turbine state sensor and determining an estimated wind characteristics $w_{estimated}$ from the measured state of the wind turbine and parameters of the wind turbine $w_{estimated}=w_{estimated}(s_{turbine})=w_{estimated}(s_{turbine}, p_{turbine})$; comparing the estimated wind characteristics $w_{estimated}$ to an expected wind characteristics $E_{estimated}(w_{measured})$ determined from the measured wind characteristics $w_{measured}$, wherein the expected wind characteristics $E_{estimated}(w_{measured})$ is determined based on the one or more wind characteristics relationships, i.e. on $E_{estimated}$ or on $E_{estimated,SEQ}$; and, operating or shutting down the wind turbine based at least in part on the comparison result.

For example, if the expected wind characteristics $E_{estimated}(w_{measured})$ is based on a sequence $E_{estimated,SEQ} = (E_{estimated,1}, E_{estimated,2}, \ldots, E_{estimated,v})$ of relationships obtained e.g. considering the wind turbine and/or a wind turbine of the same type and/or simulations, then the expected wind characteristics $E_{estimated}(w_{measured})$ may be obtained by averaging $$E_{estimated}(w_{measured}) = \text{AVERAGE}((E_{estimated,1}(w_{measured}), E_{estimated,2}(w_{measured}), \ldots, E_{estimated,v}(w_{measured})))$$

In some embodiments; interpolation or regression may be used.

In some embodiments, determining or adjusting one or more wind characteristics relationships, i.e. determining or adjusting $E_{estimated}$ or one or more relations $E_{estimated,i}$ in a sequence $E_{estimated,SEQ}$ and therefore determining or adjusting the sequence $E_{estimated,SEQ}$, is performed when the wind turbine is not in a significant stall condition and not in a disturbed condition and includes: measuring the wind characteristics $w_{measured}$ of the wind turbine with the wind characteristics sensor of the wind turbine, thereby obtaining measured wind characteristics of the wind turbine; measuring the state $s_{turbine}$ of the wind turbine with the at least one wind turbine state sensor and determining an estimated wind characteristics of the wind turbine from the measured state of the wind turbine and parameters of the wind turbine $w_{estimated}=w_{estimated}(s_{turbine}, p_{turbine})$, determining or adjusting a relationship $E_{estimated}$ or $E_{estimated,i}$ with i indicating the i-th relationship currently determined or adjusted, between the measured wind characteristics of the wind turbine and the estimated wind characteristics of the wind turbine; and adjusting the one or more wind characteristics relationships, i.e. $E_{estimated}$ or $E_{estimated,SEQ}$ to include the relationship $E_{estimated}$ or $E_{estimated,i}$ between the measured wind characteristics of the wind turbine and the estimated wind characteristics of the wind turbine.

In some embodiments, determining or adjusting one or more wind characteristics relationships i.e. $E_{estimated}$ or $E_{estimated,SEQ}$ includes: operating a wind turbine of the same type as the wind turbine when the wind turbine of the same type is not in a significant stall condition and not in a disturbed condition, the wind turbine of the same type including a wind characteristic sensor and at least one wind turbine state sensor; during the operation of the wind turbine of the same type, measuring wind characteristics of the wind turbine of the same type with the wind characteristics sensor of the wind turbine of the same type, thereby obtaining measured wind characteristics of the wind turbine of the same type; and measuring the state of the wind turbine of the same type with the at least one wind turbine state sensor of the wind turbine of the same type and determining an estimated wind characteristics of the wind turbine of the same type from the measured state of the wind turbine of the same type and parameters of the wind turbine of the same type; determining or adjusting a relationship between the measured wind characteristics of the wind turbine of the same type and the estimated wind characteristics of the wind turbine of the same type; and adjusting the one or more wind characteristics relationships i.e. $E_{estimated}$ or $E_{estimated,SEQ}$ to include the relationship between the measured wind characteristics of the wind turbine of the same type and the estimated wind characteristics of the wind turbine of the same type.

In some embodiments, determining or adjusting one or more wind characteristics relationships i.e. $E_{estimated}$ or $E_{estimated,SEQ}$ includes: simulating a wind and a wind turbine operation for the wind turbine without a significant stall condition and without a disturbed condition of the wind turbine, the simulation being based at least in part on a model of the wind turbine; obtaining simulated wind characteristics, simulated state and simulated parameters of the wind turbine, determining simulated estimated wind characteristics from the simulated state of the wind turbine and the simulated parameters of the wind turbine; determining or adjusting a relationship between the simulated wind characteristics and the simulated estimated wind characteristics; and, adjusting the one or more wind characteristics relationships i.e. $E_{estimated}$ or $E_{estimated,SEQ}$ to include the relationship between the simulated wind characteristics and the simulated estimated wind characteristics.

In some embodiments, the one or more wind characteristics relationships, i.e. $E_{estimated}$ or $E_{estimated,SEQ}$, are further combined into a single combined relationship, and the expected wind characteristics is based on the single combined relationship. For example for a sequence $E_{estimated,SEQ}$ of relationships $E_{estimated,SEQ}=(E_{estimated,1}, E_{estimated,2}, \ldots, E_{estimated,v})$ obtained e.g. considering a wind turbine and/or a wind turbine of the same type and/or simulations, a single combined relationship may associate to each value ω in the domain of the relationships in the sequence, an average value $E_{estimated}(\omega)=$AVERAGE $((E_{estimated,1}(\omega), E_{estimated,2}(\omega), \ldots, E_{estimated,v}(\omega)))$ In some embodiments missing data for some ω may be obtained e.g. with interpolation or regression.

In some embodiments, during normal turbine operation, i.e. during the operational phase, the data originating from the wind characteristics sensor, e.g. the anemometer, and the estimated wind speed is continuously evaluated and compared using e.g. the determined transfer function in a statistical sense. If the match between the expected estimated wind characteristics $E_{estimated}(w_{measured})$ and the estimated wind characteristics $w_{estimated}$ cannot be obtained with predetermined requirements, then the wind turbine is assumed to be not operating as intended, e.g. due to icing, blade fouling, or stall, and a message to a remote control center is generated so that appropriate steps to remedy the problem can be taken.

Figure 4:
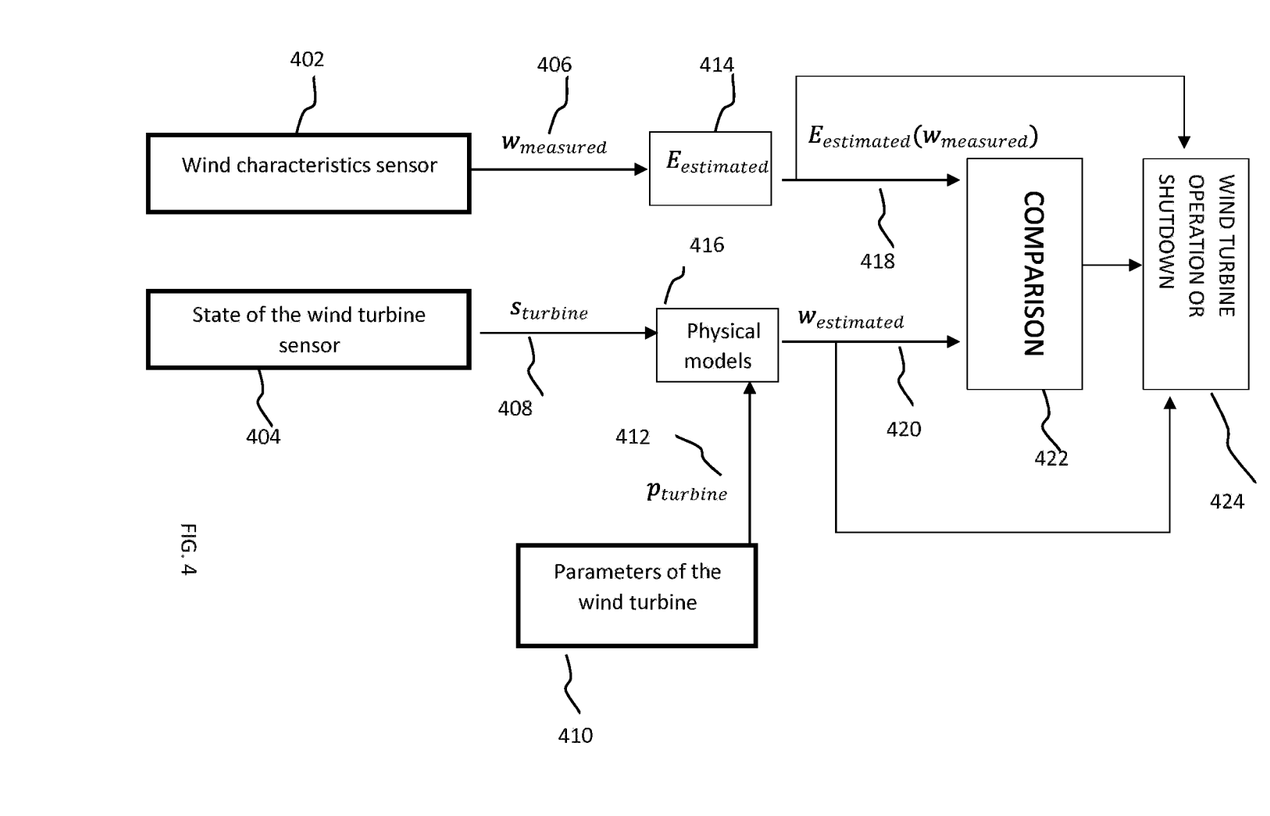
FIG. 4 illustrates details related to a method for operating a wind turbine according to embodiments of the present disclosure.

FIG. 4 summarizes details related to a method for operating a wind turbine according to some embodiments of the present disclosure. FIG. 4 shows that a wind characteristics sensor 402, that may be e.g. the wind characteristics sensor 58, provides measured wind characteristics $w_{measured}$, as indicated by 406, and at least one sensor measuring 404 the state of the wind turbine provides a measure of the state $s_{turbine}$, of the wind turbine as indicated by 408, wherein the state may e.g. include a rotational speed or a torque of a rotor and/or of a shaft of the wind turbine, e.g. the rotor shaft 44 and/or include e.g. a power output of the generator. Parameters 410 of the wind turbine are assumed to be known, e.g. pitch angles of blades of the wind turbine are assumed to be known and/or the configuration of the gearbox. The parameters 410 are indicated with $p_{turbine}$, as indicated by 412. With the use of physical models 416 estimated wind characteristics $w_{estimated}$, as shown by 420, are obtained through the physical models 416 in function of the state of the wind turbine 408 and the parameters 412 of the wind turbine. From the measured wind characteristics $w_{measured}$, indicated by 406, an expected value, e.g. $E_{estimated}(w_{measured})$ of the estimated wind characteristics is obtained based on one or more relationships, i.e. $E_{estimated}$ or $E_{estimated,SEQ}$ as indicated schematically by 414. The expected value $E_{estimated}(w_{measured})$ is indicated by 418. A comparison 422 is carried out between the expected estimated wind characteristics $E_{estimated}(w_{measured})$ indicated by 418 and the estimated wind characteristics $w_{estimated}$ indicated by 420. The wind turbine is finally operated or a shutdown is carried out, as indicated by 424, based at least in part on the comparison 422. The wind turbine operation or shutdown 424 may be based on the comparison 422 between $E_{estimated}(w_{measured})$ and $w_{estimated}$ and in particular the wind turbine operation may further depend on the values of $E_{estimated}(w_{measured})$ and/or $w_{estimated}$ and/or on a selection of one of the values e.g. $E_{estimated}(w_{measured})$, $w_{estimated}$, the selection being based on the result of the comparison 422.

Methods of the present disclosure are directed to a calibration of the wind characteristics sensor, i.e. of a wind measurement device, under the consideration of physical models from which $w_{estimated}$ is obtained during normal operation times. The wind characteristics sensor, i.e. the wind measurement device at the wind turbine location, is used to detect an under-performance of the wind turbine and/or a misbehavior of the wind turbine, e.g. due to a significant stall condition or a disturbed condition of the wind turbine in particular when the estimate $w_{estimated}$ becomes inaccurate, i.e. when the physical model-based wind speed estimation algorithms do not work properly anymore.

Methods of the present disclosure are beneficial in particular for ice detection, stall detection, the possibility to perform seasonal calibration phases. Due to the precision and accuracy of $E_{estimated}(w_{measured})$ it is furthermore possible to obtain a reliable power curve measurement with e.g. a nacelle anemometer forming a wind characteristics sensor of the wind turbine.

In some embodiments of the present disclosure, a method for operating a wind turbine is described wherein, when the comparison between e.g. $E_{estimated}(w_{measured})$ and $w_{estimated}$ shows that the estimated wind characteristics $w_{estimated}$ differ significantly from the expected wind characteristics value, e.g. $E_{estimated}(w_{measured})$, determined from the measured wind characteristics $w_{measured}$, the wind turbine is operated according to the expected wind characteristics $E_{estimated}(w_{measured})$ determined from the measured wind characteristics $w_{measured}$ or is shut down.

In some embodiments the comparison 306, 422 may include obtaining a difference Δ between the estimated wind characteristics $w_{estimated}$ and the expected wind characteristics $E_{estimated}(w_{measured})$ based on the one or more relationships i.e. on $E_{estimated}$ or $E_{estimated,SEQ}$. It is intended that Δ may be $\Delta=w_{estimated}-E_{estimated}(w_{measured})$ where $E_{estimated}$ may be the relationship $E_{estimated}$ or be based on the sequence $E_{estimated,SEQ}$. In some embodiments based on a sequence $E_{estimated,SEQ}$, with $E_{estimated,SEQ}=(E_{estimated,1}, E_{estimated,2}, \ldots, E_{estimated,\nu})$, the difference $\Delta$ may be $\Delta=w_{estimated}-\text{AVERAGE}((E_{estimated,1}(w_{measured}), E_{estimated,2}(w_{measured}), \ldots, E_{estimated,\nu}(w_{measured})))$ where AVERAGE may indicate any convenient average. Relationships $E_{estimated,i}$ in the sequence $E_{estimated,SEQ}$ may be obtained considering the wind turbine or a wind turbine of the same type or by simulation. For uniformity of notation, it is still written:

$$E_{estimated}(w_{measured})=\text{AVERAGE}((E_{estimated,1}(w_{measured}), E_{estimated,2}(w_{measured}), \ldots, E_{estimated,\nu}(w_{measured}))).$$

In some embodiments, the wind turbine is operated based at least on part on a magnitude of the difference $\Delta$.

In some embodiments the comparison 422 may correspond to the comparison 306 and includes obtaining a difference $\Delta$, e.g. a difference $w_{estimated}-E_{estimated}(w_{measured})$, between the estimated wind characteristics $w_{estimated}$ and the expected wind characteristics, e.g. $E_{estimated}(w_{measured})$, and operating the wind turbine is based at least in part on a magnitude of the difference $\Delta$.

The difference $\Delta$ may be a scalar or a vector and the magnitude of the difference, e.g. of the difference $w_{estimated}-E_{estimated}(w_{measured})$, may be measured by any suitable metric or norm, in particular by e.g. a Euclidean norm, a maximum norm, etc. In particular the magnitude of the difference $\Delta$, e.g. $w_{estimated}-E_{estimated}(w_{measured})$, is intended to be a non-negative real number and the magnitude of said difference $\Delta$ is zero if, and only if, the scalar or vectorial operands, e.g. $w_{estimated}$ and $E_{estimated}(w_{measured})$, are equal.

In some embodiments of the present disclosure, when the magnitude of the difference $\Delta$, e.g. of the difference $w_{estimated}-E_{estimated}(w_{measured})$, is below a first threshold, for example below 2 m/s or below 1 m/s, the wind turbine is operated based on the estimated wind characteristics $w_{estimated}$.

For example, in some embodiments, when $w_{estimated}$ is close to $E_{estimated}(w_{measured})$, the magnitude of the difference $w_{estimated}-E_{estimated}(w_{measured})$ comes close to zero and therefore the magnitude of the difference $w_{estimated}-E_{estimated}(w_{measured})$ is below a first threshold when $w_{estimated}$ is close to $E_{estimated}(w_{measured})$. In such a condition a significant stall condition or a disturbed condition of the wind turbine is not expected, and therefore the wind turbine is operated according to $w_{estimated}$ in particular when $w_{estimated}$ may be more accurate than $E_{estimated}(w_{measured})$ and/or $w_{measured}$.

In some embodiments, when the magnitude of the difference $\Delta$, for example of the difference $w_{estimated}-E_{estimated}(w_{measured})$, is above the first threshold, the wind turbine is operated based on the expected wind characteristic $E_{estimated}(w_{measured})$. For example, when $w_{estimated}$ differs significantly from $E_{estimated}(w_{measured})$ the magnitude of $w_{estimated}-E_{estimated}(w_{measured})$ increases above the first threshold, and the wind turbine is likely in a stall or disturbed condition and therefore likely the value of $w_{estimated}$ becomes unreliable and inaccurate. Therefore it is beneficial to operate the wind turbine according to the expected wind characteristic value, e.g. according to $E_{estimated}(w_{measured})$, for a wind turbine operation and/or for a safe operation of the wind turbine in order to prevent damage and/or for a shutdown of the wind turbine.

In some embodiments, the turbine is switched to a safe mode of operation when the magnitude of the difference $\Delta$, e.g. the difference $w_{estimated}-E_{estimated}(w_{measured})$, is above a second threshold, for example above 3 m/s.

The safe mode may be related to a control of one or more pitch angles of one or more blades of the wind turbine in order to prevent a significant stall condition or the safe mode may include shutting down the wind turbine completely.

In some embodiments, a message is transmitted to an operator when the magnitude of the difference $\Delta$, e.g. the difference $w_{estimated}-E_{estimated}(w_{measured})$, is above the first and/or the second threshold.

The transmission may be fully automated and the operator may be one or more human operators and/or one or more computers or fully or partially automated systems configured to control the wind turbine. The operator or the one or more computers or the fully or partially automated systems configured to control the wind turbine may be located in a wind park, or in a remote location or even located at the wind turbine location or in the wind turbine itself. The message may be transmitted by any suitable means, such as digital packets on a network, or as modulated radio wave signals, or on a cable or optical waveguide. The message may contain any additional information that is beneficial for the control of the wind turbine and/or for obtaining information about the wind turbine state or conditions.

In some embodiments, the magnitude of the difference $\Delta$, e.g. the difference $w_{estimated}-E_{estimated}(w_{measured})$, is memorized at different time instants forming a sequence, and based on said sequence a normal condition or a significant stall or a disturbed condition is determined, wherein in case of a significant stall or disturbed condition a type of fault is determined from the sequence, and the wind turbine is operated according to the determined type of fault.

Memorizing the difference $\Delta$, e.g. the difference $w_{estimated}-E_{estimated}(w_{measured})$, at different time instants, e.g. periodically sampling and storing said difference, produces a sequence of values forming a history of the difference. Based on said history, it is e.g. possible to record how the magnitude of the difference $\Delta$, e.g. the difference $w_{estimated}-E_{estimated}(w_{measured})$, increases when, for example, a significant stall condition or a disturbed condition occurs. From the history of the difference $\Delta$, information on the type of fault can be obtained, where a type of fault may e.g. specify if a significant stall condition is occurring, or what fault is occurring among different possible cases, e.g. with a specification stating if blades are iced, or if dirt or aging is probably affecting the wind turbine operation.

Other sources of information may as well be used in determining a type of fault, e.g. information obtained from thermometers and/or other sensors placed e.g. at or around the wind turbine location. Sources of information may as well include weather forecasts or observations and wind forecasts or measurements at different locations including the wind turbine location.

In some embodiments the wind turbine is shut down or operated in order to control a pitch angle to avoid a stalling of the wind turbine, based on the comparison of the estimated wind characteristics $w_{estimated}$ to the expected wind characteristic value, e.g. $E_{estimated}(w_{measured})$, determined from the measured wind characteristics $w_{measured}$.

In some embodiments, operating or shutting down the wind turbine includes adjusting a pitch angle to avoid a significant stall condition of the wind turbine.

The calibration phase may include repeated measurements of $w_{measured}$ and of $s_{turbine}$ such that a sufficient number of ordered pairs is obtained in order to obtain a sufficiently precise and accurate value for e.g. $E_{estimated}(\omega)$, for each possible output value $\omega$ of the wind characteristic sensor. A sufficiently precise and accurate value may be present when, for example, a narrow enough confidence interval related to an average value of the sequence $S_{estimated}[\omega]$ obtained from $S[\omega]$ as described previously can be determined, e.g. considering values in the sequence $S_{estimated}[\omega]$ as samples of a Monte Carlo experiment for which a desired width of the confidence interval is demanded for a desired confidence level.

A calibration phase for determining or adjusting one or more wind characteristics relationships may be carried out when it is known that a significant stall condition or a disturbed condition is not present. Said determination may be fully automated, e.g. automatically checking temperature and wind and other conditions at the wind turbine location, like the presence of dirt or said determination may be partially automated or be the result of a human supervision. A calibration phase may include the use of measurement instruments that may be removed after the calibration phase is completed. A human supervision may be present during a calibration phase and absent afterwards or the calibration may be fully automated.

Calibration phases and operation phases may alternate, e.g. periodically alternating, in order to recalibrate, i.e. to adjust, e.g. $E_{estimated}$ or $E_{estimated,SEQ}$ in order to account for e.g. an aging of the wind turbine or other time varying properties of the wind turbine and/or to account for modifications in the aerodynamic properties of the wind turbine location.

In some embodiments, the calibration phase is repeated until the expected wind characteristics value approximates the estimated wind characteristics with sufficient accuracy and precision.

In some embodiments during the calibration phase, the measured wind characteristics further comprise measured data from one or more wind measurement masts positioned at some distance from the wind turbine.

Therefore, in some embodiments, $w_{measured}$ may be a vector including values obtained from at least one local anemometer and/or at least one measurement mast for measuring a wind condition at some distance from the wind turbine.

In some embodiments, a wind turbine is described, the wind turbine including: at least one wind measurement sensor, a wind turbine state sensor to measure a state of the wind turbine for estimating wind characteristics at the wind turbine location, a control system configured to control the wind turbine based at least in part on inputs formed by measured wind characteristics measured by the wind measurement sensor, and by measured wind turbine states measured by the wind turbine state sensor, wherein the control system is configured to operate the wind turbine according to methods described in the present disclosure. It is assumed that wind turbine parameters are known by the control system.

In some embodiments, the wind characteristic may be a wind speed or a magnitude of a wind speed and the wind characteristics sensor measures a magnitude of the wind speed or the wind speed. In some embodiments, the wind characteristics sensor may measure a magnitude and a direction of the wind speed. In some embodiments the wind characteristics sensor may measure a vector describing the wind speed. In some embodiments the magnitude of the wind speed may be measured in m/s.

In some embodiments, the wind turbine further includes an information processing system and at least one communication channel configured to transmit information about the comparison of the estimated wind characteristics to the expected wind characteristics during the operation phase.

The transmitted information transmitted, for instance over the communication channel, may be used to control or monitor the wind turbine operation.

Operating a wind turbine according to methods described herein or as illustrated in FIG. 4 is beneficial in particular for detecting a significant stall condition or a disturbed condition and allows an operation of the wind turbine that minimizes the risks of damage to the wind turbine and/or that maximizes a performance of the wind turbine in particular during a significant stall condition or a disturbed condition, such as an increased magnitude of the difference $\Delta$, e.g. the difference $w_{estimated} - E_{estimated}(w_{measured})$, may e.g. be related to dirt deposited on the blades of the wind turbine or to icing or to any other disturbed condition and/or to a significant stall condition. Methods of the present disclosure may allow to detect the disturbed condition and the significant stall condition, according to e.g. a history of the magnitude of the difference $\Delta$, e.g. the difference $w_{estimated} - E_{estimated}(w_{measured})$, memorized at different time instants in a sequence. An increased magnitude of the difference $\Delta$, e.g. the difference $w_{estimated} - E_{estimated}(w_{measured})$, may also be related to e.g. a significant stall condition that may also be detected e.g. according to a sequence of values of the magnitude of the difference $\Delta$, e.g the difference $w_{estimated} - E_{estimated}(w_{measured})$, memorized at different time instants. In this case, i.e. if a significant stall condition is detected, it is beneficial to adjust a pitch angle of one or more blades of the wind turbine or to shut down the wind turbine in order to prevent e.g. a damage to the wind turbine.

The invention claimed is:

1. A method for operating a wind turbine, the wind turbine including a local wind characteristics sensor configured on the wind turbine for measuring a wind characteristic at the wind turbine and at least one wind turbine state sensor for measuring a state of the wind turbine, the method comprising:
   in a calibration phase, determining or adjusting one or more relationships between measured wind characteristics and estimated wind characteristics at the wind turbine location;
   performing an operation phase; the operation phase including:
      measuring the wind characteristics with the wind characteristics sensor, thereby obtaining measured wind characteristics for conditions of the wind at the wind turbine;
      measuring the state of the wind turbine with the at least one wind turbine state sensor and determining an estimated wind characteristic from the measured state of the wind turbine and parameters of the wind turbine;
      comparing the estimated wind characteristics to an expected wind characteristics determined from the measured wind characteristics, wherein the expected wind characteristics is determined based on the measured wind characteristics and the one or more wind characteristics relationships; and,
      operating or shutting down the wind turbine based at east in part on the comparison result.

2. The method of claim 1, wherein the calibration phase is performed when the wind turbine is not in a significant stall condition and not in a disturbed condition and comprises:

measuring the wind characteristics of the wind turbine with the wind characteristics sensor of the wind turbine, thereby obtaining measured wind characteristics of the wind turbine;

measuring the state of the wind turbine with the at least one wind turbine state sensor and determining an estimated wind characteristics of the wind turbine from the measured state of the wind turbine and parameters of the wind turbine, determining or adjusting a relationship between the measured wind characteristics of the wind turbine and the estimated wind characteristics of the wind turbine; and adjusting the one or more wind characteristics relationships to include the relationship between the measured wind characteristics of the wind turbine and the estimated wind characteristics of the wind turbine.

3. The method of claim 1, wherein the calibration phase comprises:

operating a wind turbine of the same type as the wind turbine when the wind turbine of the same type is not in a significant stall condition and not in a disturbed condition, the wind turbine of the same type including a wind characteristic sensor and at least one wind turbine state sensor; and, during the operation of the wind turbine of the same type, the method further including:

measuring wind characteristics of the wind turbine of the same type with the wind characteristics sensor of the wind turbine of the same type, thereby obtaining measured wind characteristics of the wind turbine of the same type;

measuring the state of the wind turbine of the same type with the at least one wind turbine state sensor of the wind turbine of the same type and determining an estimated wind characteristics of the wind turbine of the same type from the measured state of the wind turbine of the same type and parameters of the wind turbine of the same type;

determining or adjusting a relationship between the measured wind characteristics of the wind turbine of the same type and the estimated wind characteristics of the wind turbine of the same type; and adjusting the one or more wind characteristics relationships to include the relationship between the measured wind characteristics of the wind turbine of the same type and the estimated wind characteristics of the wind turbine of the same type.

4. The method of claim 1, wherein the calibration phase comprises:

simulating a wind and a wind turbine operation for the wind turbine without a significant stall condition and without a disturbed condition of the wind turbine, the simulation being based at least in part on a model of the wind turbine;

obtaining simulated wind characteristics, simulated state and simulated parameters of the wind turbine, determining simulated estimated wind characteristics from the simulated state of the wind turbine and the simulated parameters of the wind turbine;

determining or adjusting a relationship between the simulated wind characteristics and the simulated estimated wind characteristics; and adjusting the one or more wind characteristics relationships to include the relationship between the simulated wind characteristics and the simulated estimated wind characteristics.

5. The method of claim 1, wherein the one or more wind characteristics relationships are further combined into a single combined relationship, and wherein the expected wind characteristics is based on the single combined relationship.

6. The method of claim 1, wherein when the comparison shows that the estimated wind characteristics differs significantly from the expected wind characteristics determined from the measured wind characteristics, the wind turbine is operated according to the expected wind characteristics determined from the measured wind characteristics or is shut down.

7. The method of claim 1, wherein the comparing includes obtaining a difference between the estimated wind characteristics and the expected wind characteristics and operating the wind turbine is based at least in part on a magnitude of the difference.

8. The method of claim 7, wherein, when the magnitude of the difference is below a first threshold, the wind turbine is operated based on the estimated wind characteristics.

9. The method of claim 7, wherein when the magnitude of the difference is above the first threshold, the wind turbine is operated based on the expected wind characteristics.

10. The method of claim 7, wherein the turbine is switched to a safe mode of operation or is shut down when the magnitude of the difference is above a second threshold.

11. The method of claim 7, wherein a message is transmitted to an operator when the magnitude of the difference is above the first and/or the second threshold.

12. The method of claim 7, wherein the magnitude of the difference is memorized at different time instants forming a sequence, and wherein based on said sequence a normal condition, or a significant stall or disturbed condition, is determined, and wherein in case of a significant stall or disturbed condition a type of fault is determined from the sequence, and the wind turbine is operated according to the determined type of the fault.

13. The method of claim 1, wherein operating or shutting down the wind turbine includes adjusting a pitch angle to avoid a significant stall condition of the wind turbine.

14. The method of claim 1, wherein the wind characteristic is a wind speed and the wind characteristics sensor measures a magnitude of the wind speed.

15. A wind turbine comprising at least one wind measurement sensor;

a wind turbine state sensor to measure a state of the wind turbine for estimating wind characteristics at the wind turbine location;

a control system configured to control the wind turbine based at least in part on inputs formed by measured wind characteristics measured by the wind measurement sensor, and by measured wind turbine states measured by the wind turbine state sensor; and wherein the control system is configured to operate the wind turbine according to the method of claim 1.

* * * * *